United States Patent [19]

Baur

[11] 4,379,439
[45] Apr. 12, 1983

[54] ANIMAL FEEDER

[76] Inventor: Robert P. Baur, 8425 Filion Rd., Pigeon, Mich. 48755

[21] Appl. No.: 302,253

[22] Filed: Sep. 14, 1981

[51] Int. Cl.[3] .............................................. A01K 5/02
[52] U.S. Cl. .................................................. 119/52 B
[58] Field of Search ............................... 119/52 B, 18

[56] References Cited

U.S. PATENT DOCUMENTS

| 3,312,194 | 4/1967 | Ernst | 119/22 |
|---|---|---|---|
| 3,319,606 | 5/1967 | Virgil | 119/51 |
| 3,664,302 | 5/1972 | Wienert | 119/18 |
| 3,722,475 | 3/1973 | Wittern et al. | 119/51.11 |
| 3,768,442 | 10/1973 | Van Huis | 119/18 |
| 3,768,444 | 10/1973 | Van Huis | 119/22 |
| 3,941,091 | 3/1976 | Fleshman | 119/18 |
| 3,970,044 | 7/1976 | Peppler et al. | 119/18 |
| 4,019,461 | 4/1977 | Keen et al. | 119/18 |
| 4,195,594 | 4/1980 | Siciliano et al. | 119/52 B |

Primary Examiner—Hugh R. Chamblee
Attorney, Agent, or Firm—Basile, Weintraub & Hanlon

[57] ABSTRACT

An animal feeder for an animal cage assembly formed of a plurality of animal cages arranged side-by-side in a horizontal alignment. The animal feeder comprises a carriage which is mounted for horizontal movement along the cage assembly. A feed mechanism carried by the carriage dispenses feed into a feed trough mounted along the front of the animal cages as the carriage traverses the cage assembly. A control apparatus mounted on the carriage de-activates the feed mechanism when predetermined levels of feed remaining in the feed trough are detected. A detector carried by the control apparatus detects the level of feed remaining in the feed trough as the carriage traverses the cage assembly.

7 Claims, 3 Drawing Figures

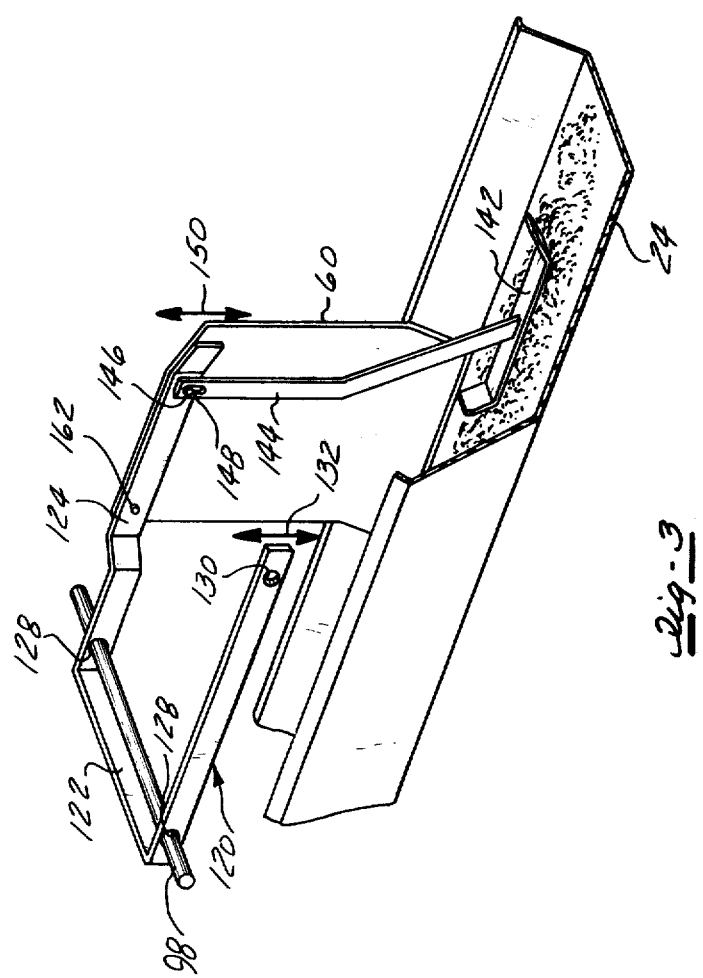

ANIMAL FEEDER

BACKGROUND OF THE INVENTION

1. Field of the Invention

This invention relates, in general, to animal feeder apparatus and, more specifically, to animal feeder apparatus for automatically feed to a plurality of animal cages.

2. Description of the Prior Art

In the poultry industry, maximum egg production is achieved by constructing animal cages in a multi-tier arrangement in which a plurality of cages are arranged side-by-side in a horizontal alignment, with tiers of cages stacked above each other, two, three or four high. Such an arrangement increases the efficiency of space utilization within a building.

In such a tiered cage arrangement, the eggs are automatically collected on a conveyor belt and carried to a collection station. Manure or droppings from the animals are collected on a second conveyor belt located beneath each row of cages and removed from the cage area where the belt is scraped and cleaned.

A feed carriage moves horizontally along the front of the rows of cages and dispenses feed into a feed trough mounted at the front edge of each row of cages. The feed carriage is activated at preset time intervals throughout the day to dispense the feed in predetermined measured amounts. Further, the rate at which the feed is dispensed as the carriage traverses along the animal cages may be varied to provide a desired dietary program for the animals.

Even though the feed rate is variable, once a selected rate is chosen it remains constant from each pass of the feeder along the row of cages. This has created problems since the number of animals in each cage may vary and, in some instances, certain cages in a particular row may be entirely empty. Thus, a feed rate selected to provide a desired amount of feed for the normal number of animals in each cage would result in a build up of feed in front of those cages containing fewer or no animals. Such excess amounts of feed eventually overflow the sides of the feed trough and fall onto the floor or onto the waste removal conveyor belt. In either case, feed is wasted which results in increased feed costs for the egg laying operation.

In addition, an excessive amount of feed in front of certain cages will cause the animals to eat the feed in amounts in excess of that desired, thereby defeating the controlled dietary program essential to quality egg production.

Thus, it would be desirable to provide an animal feeder for a multi-tier arrangement of animal cages which overcomes the problems of similar prior art animal feeders. It would also be desirable to provide an animal feeder which automatically controls the dispensing of feed to the animal cages in relation to the amount of feed remaining in the feed trough in front of the animal cages. Finally, it would be desirable to provide an animal feeder which is operative to maintain a predetermined level of feed in the feed trough of the animal cages.

SUMMARY OF THE INVENTION

There is disclosed herein a unique animal feeder for an animal cage assembly formed of a plurality of cages arranged side-by-side in a horizontal alignment. The animal feeder comprises a carriage means which is mounted for horizontal movement along the cage assembly. A feed means carried by the carriage means dispenses feed into a feed trough positioned in front of the cages as the carriage means traverses the cage assembly. Control means mounted on the carriage deactivates the feed means when predetermined levels of feed remaining in the feed trough are detected. A detector means carried by the control means detects the level of feed remaining in the feed trough as the carriage means moves along the cage assembly.

In a preferred embodiment, the feed means comprises an auger mounted within a feed hopper in the carriage. A drive means, such as an electric motor, is provided to activate the auger as the carriage moves along the cage assembly.

The control means is formed of a U-shaped arm having a pair of legs extending outward from a common base. The arm is pivotally mounted to the carriage at one end and carries the detector means at the end of one of the legs such that the detector means rides along the top of the feed remaining in the feed trough as the carriage traverses the row of cages and causes the arm to pivot in response to the level of feed remaining in the feed trough. The arm, when pivoted in response to the detection of predetermined levels of feed remaining in the feed trough, is operative to disengage the feed means from the drive means and thereby prevent additional amounts of feed from being disposed into that portion of the feed trough.

In a cage assembly comprised of multi-tier rows of cages, the animal feeder comprises a plurality of feed means, control means and detector means, each associated with one row of animal cages.

The animal feeder of the present invention overcomes many of the problems of similar prior art animal feeders insofar as automatically controlling the dispensing of feed into the feed trough of the cage assembly in response to the amount of feed that remains in a particular portion of the feed trough. Thus, if a predetermined amount of feed remains in a particular portion of the trough, such as that that would result from a fewer number of animals being in a particular cage, additional feed will not be dispensed, thereby minimizing waste or use of excessive amounts of feed which is common in similar prior art animal feeder apparatus.

BRIEF DESCRIPTION OF THE DRAWING

The various features, advantages and other uses of the present invention will be more apparent by referring to the following detailed description and drawing in which:

FIG. 3 is a perspective view of the control and detector means of the present invention.

DESCRIPTION OF THE PREFERRED EMBODIMENTS

Figure 1:
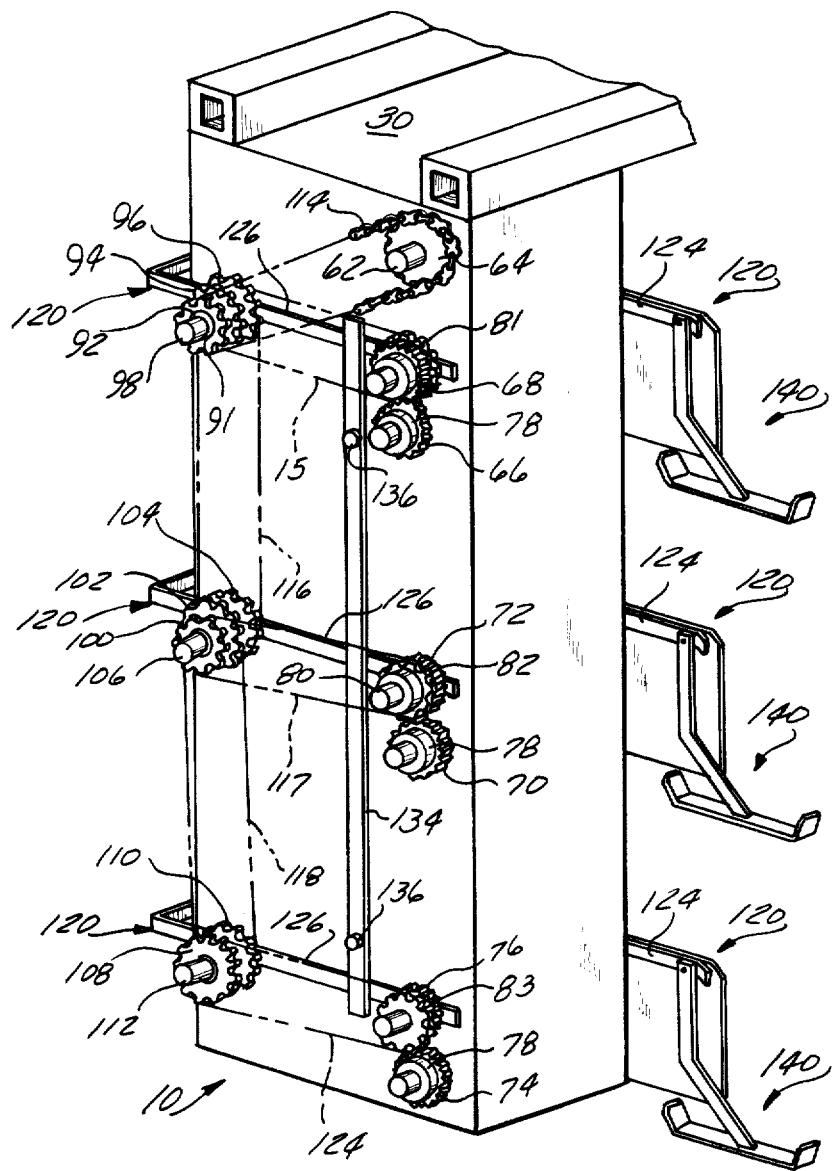
FIG. 1 is a perspective view of the animal feeder of the present invention.

Throughout the following description and drawing, identical reference numbers are used to refer to the same component shown in multiple figures of the drawing.

Referring now to the drawing, there is illustrated an animal feeder 10 for use with an animal cage assembly which automatically dispenses feed to the animal cages.

Figure 2:
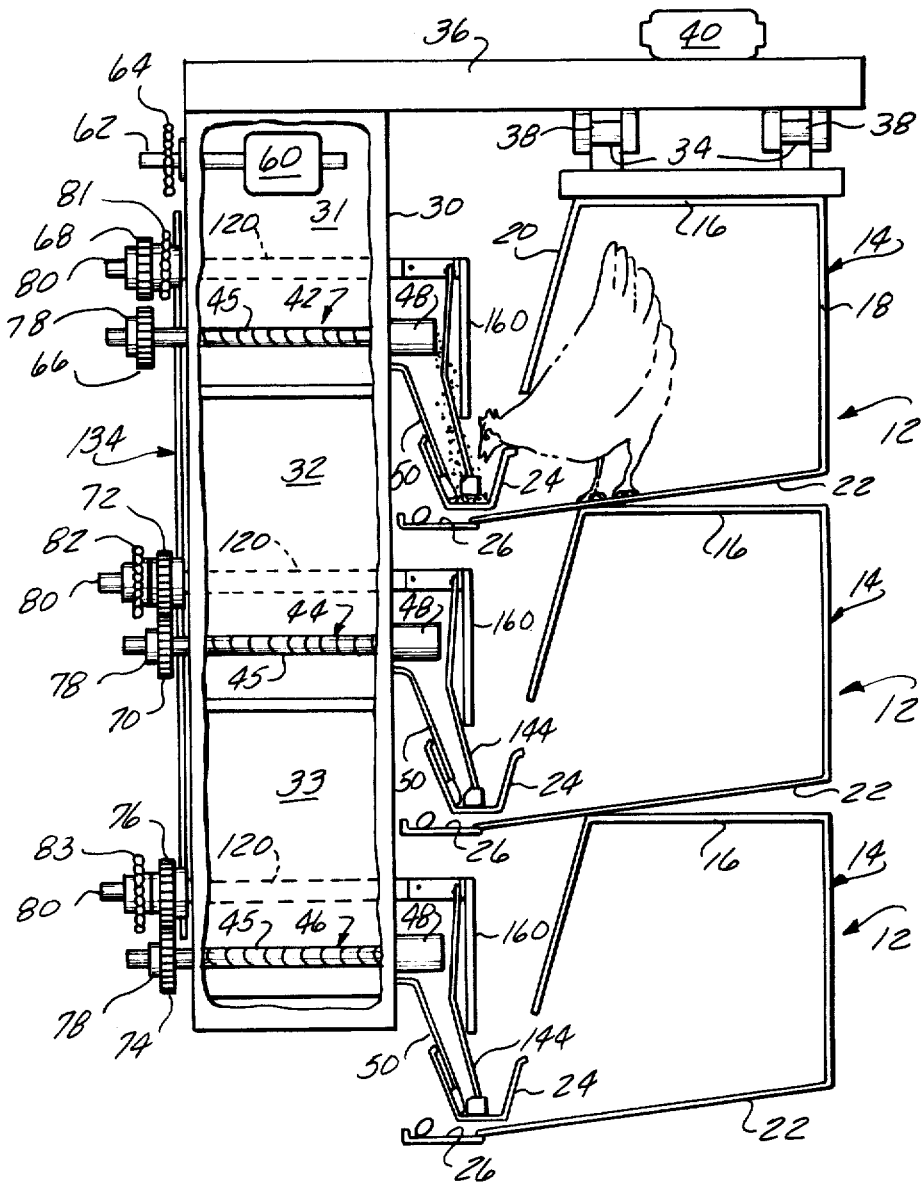
FIG. 2 is a right-hand side view of the animal feeder illustrated in FIG. 1.

The animal cage assembly, denoted in general by reference number 12 in FIG. 2, includes, by way of illustration and not of limitation, a plurality of identically constructed animal cages 14 which are arranged side-by-side in a substantially horizontal orientation to form a row. The cages 14 are further arranged in tiers, stacked one upon another, preferably three high, to form the complete cage assembly 12.

Each of the cages 14 is formed of a suitable mesh material, such as wire or plastic, and is formed with a top 16, sides, a back wall 18, a pivotal front door 20 and a bottom 22. A feed trough 24 having a substantially U-shaped configuration with sides tapering outward from a flat bottom is mounted adjacent the bottom edge of the front door 20. In this manner, the animals in the cages 14 may poke their heads through the front door 20 to reach the feed contained in the feed trough 24.

Although the animal feeder 10 of the present invention is suitable for dispensing feed to a cage assembly which contains any specie of animal, the following discussion, by way of example only, will depict the use of the animal feeder 10 in a poultry operation and, in particular, with a poultry operation in which chickens are housed and fed solely to produce eggs.

Thus, the cage assembly 12 includes an egg collection belt 26 which is disposed adjacent the front edge of the bottom wall 22 of the animal cages 14 for receiving eggs laid by the chickens. Suitable waste removal belts and watering systems, conventionally used with such animal cages, are not shown for reasons of clarity.

Referring now to FIGS. 1 and 2, there is illustrated a carriage means 30 of the animal feeder 10. The carriage means 30 is movably disposed for horizontal movement along the front of the cage assembly 12. The carriage means 30 is in the form of a cubical enclosure which is internally divided into sections of hoppers 31, 32 and 33 for receiving and holding feed for the animals housed in the cages 14.

As shown in FIG. 2, the carriage means 30 is movably disposed adjacent the front edge of the cage assembly 12. A pair of spaced rails 34 are mounted on the top of the uppermost row of cages 14 and extend the entire length of the cage assembly 12. A suitable frame 36 formed of beam members is secured at one end to the top of the cubical enclosure and supports adjacent its opposed end two pairs of wheels 38 which rotatably engage the rails 34 mounted on the cage assembly 12. The rails 34 thus form a pair of tracks along which the carriage means 30 moves.

Drive means 40 in the form of a reversible electrical motor is mounted to the frame assembly 36 and is operative to drive the wheels 38 along the pair of spaced rails 34 in both forward and reverse directions along the cage assembly 12.

The animal feeder 10 also includes feed means which is carried by the carriage means 30 for dispensing feed into the feed troughs 24 associated with each row of animal cages 14. Thus, as the cage assembly 12 is constructed with three tiers of cages, the animal feeder 10 likewise includes three identical feed means, such as feed means 42, 44 and 46.

In the preferred embodiment, each of the feed means 42, 44 and 46 includes an auger 45 which is rotatably mounted in the carriage means 30 and has one end extending through a hollow conduit 48 mounted on one side of the cubical enclosure. The conduits 48 respectively communicate with the hoppers 31, 32 and 33 formed in the enclosure. Such auger 45 is operative, when rotated, to move the feed from the hoppers through the conduits 48 whereon it falls into the feed trough 24 of each row of animal cages 14 as the carriage 30 traverses the cage assembly 12.

A leveler 50 in the form of an elongated arm is secured to the carriage means 30 and is operative to level off the feed deposited in each feed trough 24.

A first drive means is carried by the carriage 30 for activating the augers 45 of the feed means 42, 44 and 46. The first drive means includes power means 60 in the form of an electrical motor mounted within the carriage 30. The output shaft 62 of the motor 60 extends through a side wall of the carriage and has a suitably formed sprocket wheel 64 mounted thereon.

The first drive means further includes means driven by the drive means 60 and operatively coupled to the auger 45 of the feed means 42. The feed activating means includes sets of first and second gears for driving each auger 45. Thus, first and second gears 66 and 68, respectively, are associated with the first feed means 42, first and second gears 70 and 72, respectively, are associated with the second feed means 44 and first and second gears 74 and 76, respectively, are associated with the third feed means 46. Although each of the first and second gears is identically formed in the preferred embodiment of the present invention, it is apparent that different gear sizes or ratios may be used to vary the rate of rotation of the individual augers 45 so as to provide a predetermined feed rate for dispensing feed into the feed troughs 24 of the cage assembly 12.

Each of the first gears 66, 70 and 74 is concentrically mounted on the shaft of the augers 45 exteriorly of the carriage and is secured in position by a circular block 78 which is pinned to the auger shaft. As such, the first gears 66, 70 and 74 rotate with the augers 45.

The second gears 68, 72, 76 are spaced from the mating first gears 66, 70 and 74, respectively, and are adapted to mesh and rotatably drive the respective first gears 66, 70 and 74. Each of the second gears 68, 72 and 76 is mounted about a cylindrical pivotal rod 80 which forms the axis of rotation of each of the second gears.

Means are provided for interconnecting the power means or motor 60 and the second gears 68, 72 and 76 so as to drive the second gears as the carriage means 30 moves along the cage assembly 12 and rotate the corresponding first gears and augers to dispense feed into the feed troughs 24 of each row of the cage assembly 12. In the preferred embodiment, the interconnecting means includes respective sprocket wheels 81, 82 and 83 which are concentrically mounted about the rods 80 and are spaced from the adjacent second gears 68, 72 and 76 by means of cylindrical spacer discs 84. A stop member 85 is pinned to the rods 80 so as to hold the sprocket wheels 81, 82 and 83 and the respective second gears 68, 72 and 76 securely thereon.

The interconnecting means further includes a suitably formed chain link belt which is provided in a plurality of individual continuous sections to interconnect the sprocket 64 on the motor 60 and the sprocket wheels 81, 82 and 83 associated with each of the second gears 68, 72 and 76.

As the animal feeder 10 of the present invention includes three individual feed mechanisms 42, 44 and 46 for dispensing feed into the feed troughs 24 of three tiers of horizontally aligned cages, additional sets of sprocket wheels are provided to transmit rotary movement from the motor 60 to the sprockets 81, 82 and 83 and the second gears 68, 72 and 76 of the respective feed mechanisms 42, 44 and 46. Thus, the first feed means 42 has associated therewith three co-axially aligned sprocket wheels 90, 92 and 96 which are mounted on an elongated shaft 98 extending through one end of the carriage 30. Similarly, the second feed means 44 has three identical sprocket wheels 100, 102 and 104 co-axially mounted on a shaft 106 extending through the carriage 30. Finally, the third feed means 46 has a pair of sprocket wheels 108 and 110 mounted on an elongated shaft 112.

As shown in FIG. 1, a first continuous chain link belt 114 interconnects the sprocket wheels 64 and 92 to transmit rotary power from the motor 60 to the sprocket wheel 92. A second belt 115, depicted in phantom, interconnects sprocket wheel 94 and sprocket wheel 81 to transmit this rotary power to the second gear 68. A third belt 116 extends between sprocket wheel 96 and sprocket wheel 104 to transmit rotary motion to the second feed means 44. Another chain link belt 117 interconnects sprocket wheels 100 and 82 to transmit rotary movement to the second gear 72; while a belt 118 extends between sprocket wheel 102 and sprocket wheel 110 to transmit rotary motion to the third feed means 46. Finally, a belt 119 interconnects sprocket 108 and sprocket 83 to transmit rotary movement to the second gear 76.

In operation, energization of the motor 60 as the carriage 30 traverses the front of the cage assembly 12 results in rotation of the sprocket wheel 64 which, through the various chain link belts, results in simultaneous rotation of the second gears 68, 72 and 76. In a normal feeding operation, the second gears 68, 72 and 76 mesh with the respective first gears 66, 70 and 74 causing rotation thereof which results in rotation of the respective augers 45 of the feed means 42, 44 and 46 and causes feed to be dispensed from the hoppers 31, 32 and 33 in the carriage means 30 into the feed troughs 24 of the tiered rows of animal cages 14 as the carriage means 30 traverses the cage assembly 12 in one direction.

Preferably, the feed is dispensed into the feed troughs 24 as the carriage 30 moves in one direction only along the cage assembly 12. Thus, to prevent the further dispensing of feed as the carriage 30 returns to the start position, the sprocket 92 is constructed with unidirectional means so as to cause rotation of the shaft 98 when it rotates in one direction only. The unidirectional means comprises a rachet dog 91 integrally formed with the sprocket 92 which causes rotation of the sprocket 92 and shaft 98 of the first feed means 42 in one direction and permits the sprocket 92 to slip thereover when the carriage 30 moves in a reverse direction to the start position. In this manner, rotation of the shafts 98, 106 and 112 of the feed means 42, 44 and 46 is prevented as the carriage 30 moves in a second or reverse direction which also prevents rotation of the augers 45.

As shown in FIGS. 1 and 2 and in greater detail in FIG. 3, the animal feeder 10 includes control means, denoted in general by reference number 120 which is carried by the carriage means 30 and is operative for de-activating the respective feed means 42, 44 and 46 when predetermined levels of feed are detected in the feed troughs 24 of the rows of animal cages 14. As the control means 120 for each of the feed means 42, 44 and 46 is identically constructed, only one will be described in detail hereafter.

As shown in FIG. 3, the control means 120 is in the form of an arm which has a substantially U-shaped configuration including a base 122 and a pair of outwardly extending legs 124 and 126. Each leg 124 and 126 of the control arm 120 has a pair of aligned apertures 128 located adjacent the base 122 which receive rod 98 extending through the carriage means 30 so as to pivotally connect the arm 120 to the carriage means 30. The opposed end of the second leg 126 of the control arm 120 has an aperture 130 formed therein which rotatably receives the rod 80 on which the second gear 68 and sprocket wheel 81 are mounted.

Thus, as described in greater detail hereafter, pivotal movement of the control arm 120 about the rod 98 will result in movement of the leg 126 as shown by arrow 132 which causes the second gear 68 to move concurrently therewith to selectively engage and disengage the first gear 66 so as to selectively activate or de-activate the augers 45 of the first feed means 42 and thereby control the dispensing of feed to the trough 24 of the upper row of cages 14.

As shown in FIG. 1, legs 124 and 126 of each control arm 120 stradle opposed sides of the carriage means 30. The second leg 126 of each control arm 120 is held in position for vertical movement by means of stop strap 134 which is mounted by suitable fasteners 136, such as bolts, to the side of the carriage 30.

Detector means, denoted in general by reference number 140, is carried by each of the control means 120 and detects the level of feed remaining in the feed trough 24 of each row of cages as the carriage means 30 traverses the cage assembly 12. As shown in FIG. 3, the detector means 140 comprises a two part assembly formed of a base 142 and an upright support strap 144. The base 142 has a substantially flat central section which terminates in upwardly inclined ends. The upright support strap 144 is secured to the central portion of the base 142 by suitable means, such as by welding. The upper end of the support strap 144 is secured, by suitable fastening means, such as bolt 146, to the end of the first leg 124 of the control arm 120. An elongated slot 148 is formed at the upper end of the support strap 144 to provide variable positioning of the detector means 140 with respect to control arm 120. A planar shield 160, preferably formed of a plastic material, is seared to the first leg 124 by suitable fasteners 162, such as bolts or pop rivets. The shield 160 extends downward towards the base 142 and stiffens the detector means 140 to prevent inadvertent movement of the detector means 140 if it strikes an obstruction, such as an open cage door, as it moves along the trough 24.

The detector means 140 is adapted to ride within the feed trough 24 as the carriage means 30 traverses the front of the cage assembly 12, with the base member 142 riding along the top surface of the feed remaining in the feed trough 24. As the control arm 120 is pivotally connected to the carriage 30, movement of the detector means 140 as shown by arrow 150 as the base member 142 rides along the top of the feed in the feed trough 24 causes pivotal movement of both legs 124 and 126 of the control arm 120. When an excessive amount of feed remains in the feed trough 24 so as to cause the detector means 140 and the control arm 120 to pivot upwards a predetermined amount, the second gear mounted at the end of the leg 126 of the control arm 120 will disengage from its corresponding first gear thereby de-activating the corresponding feed means and halting the dispensing of feed into that portion of the feed trough 24. As the carriage means 30 continues to traverse the cage assembly 12, the detector means 140 will continue to traverse the top surface of the feed in the feed trough 24 and, when a lesser amount of feed is encountered so as to lower the detector means 140, the control arm 120 will pivot downward to cause the second gear to engage the first gear, re-activating the feed means and re-initiating the dispensing of feed into the feed trough 24.

In this manner, the amount of feed that is dispensed into the feed trough 24 is selectively controlled as the carriage means 30 traverses the front of the cage assembly 12 so as to maintain a predetermined amount of feed along the entire length of the feed trough 24. When excessive amounts of feed remaining in the feed trough 24 from the last feed cycle are encountered, the detector means 140, in conjunction with the control arm 120 and associated second gear mounted thereon, will disconnect the corresponding first gear and auger 45 from the drive means 60 thereby halting the dispensing of feed into the portion of the feed trough 24.

Thus, there has been disclosed herein a unique animal feeder which controls the amount of feed that is dispensed to a row of animal cages in relation to the amount of feed that remains in the feed trough of the cages. Thus, excessive amounts of feed are not dispensed into the feed trough which minimizes waste and lowers the overall cost of feed utilized in the feeding operation.

What is claimed is:

1. An aminal feeder for an animal cage assembly formed of a plurality of animal cages arranged side-by-side in a horizontal alignment, with a feed trough extending along the front of the animal cages, the animal feeder comprising:
   carriage means movably disposed for horizontal movement along the front of the cage assembly, the carriage means including a hopper for storing feed;
   feed means carried by the carriage means for dispensing feed from the hopper into the feed trough;
   first drive means for activating the feed means, the first drive means including an electric motor and means driven by the electric motor and operatively coupled to the feed means for activating the feed means;
   control means, carried by the carriage means, for deactivating the feed means when predetermined levels of feed are detected in the feed trough; and
   detector means for detecting the level of feed remaining in the feed trough as the carriage means traverses along the cage assembly, the detector means being carried by and causing pivotal movement of the control means when a predetermined level of feed is detected in the feed trough;
   the control means decoupling the feed activating means from the feed means to stop dispensing of feed when the predetermined level of feed trough is detected.

2. The animal feeder of claim 1 wherein the cage assembly includes a plurality of vertically arranged, horizontally extending rows of animal cages and the animal feeder includes independently operable feed means, detector means, and control means associated with each row of the animal cages.

3. The animal feeder of claim 1 wherein the control means comprises an arm pivotally mounted on the carriage means, the arm having a substantially U-shape with a pair of spaced legs extending outward from a common base, the arm carrying the detector means on one of the legs and being pivotal in response to movement of the detector means as the carriage means traverses along the cage assembly.

4. The animal feeder of claim 3 wherein the feed means includes an auger mounted within the hopper for dispensing feed from the hopper into the feed trough.

5. An animal feeder for an aminal cage assembly formed of a plurality of animal cages arranged side-by-side in a horizontal alignment, with a feed trough extending along the front of the animal cages, the animal feeder comprising:
   carriage means movably disposed for horizontal movement along the front of the cage assembly, the carriage means including a hopper for storing feed;
   feed means carried by the carriage means for dispensing feed into the feed trough, the feed means including an auger mounted within the hopper for disfeed from the hopper into the feed trough;
   control means, carried by the carriage means, for deactivating the feed means when predetermined levels of feed are detected in the feed trough; and
   detector means, carried by the control means, for detecting the level of feed remaining in the feed trough as the carriage means traverses the cage assembly;
   the control means comprising an arm pivotally mounted on the carriage means, the arm having a substantially U-shape with a pair of spaced legs extending outward from a common base, the arm carrying the detector means on one of the legs and being pivotal in response to movement of the detector means as the carriage means traverses the cage assembly for selectively de-energizing the feed means;
   the feed means including:
   an electrical motor;
   a first gear co-axially attached to the auger and rotatable therewith;
   a second gear adapted to mesh with the first gear, the second gear being mounted on the other of the legs of the arm and pivotally movable therewith between lower and raised positions; and
   means for interconnecting the motor and the second gear so as to drive the second gear as the carriage means traverses the cage assembly, the second gear meshing with and driving the first gear and the auger attached thereto when the arm is in a lower position.

6. The animal feeder of claim 5 wherein the drive means includes:
   unidirectional means for causing rotation of the second gear on movement of the carriage means in a first direction only such that feed is dispensed as the carriage means moves in a first direction only.

7. The animal feeder of claim 5 wherein the interconnecting mens comprises a sprocket mounted co-axially with the second gear and rotatable therewith and at least one link belt connecting the motor to the sprocket for causing rotation thereof.

* * * * *